United States Patent [19]

Ciolli

[11] E Patent Number: Re. 33,514

[45] Reissued Date of Patent: Jan. 8, 1991

[54] ADJUSTABLE TORQUE LIMITING ASSEMBLY

[75] Inventor: Donald A. Ciolli, University Heights, Ohio

[73] Assignee: American Assembly Tools, Inc., Cleveland, Ohio

[21] Appl. No.: 104,004

[22] Filed: Oct. 2, 1987

Related U.S. Patent Documents

Reissue of:

[64] Patent No.: 4,610,339
Issued: Sep. 9, 1986
Appl. No.: 790,789
Filed: Oct. 24, 1985

U.S. Applications:

[63] Continuation of Ser. No. 568,773, Jan. 6, 1984, abandoned.

[51] Int. Cl.[5] ..... F16D 43/21; F16D 13/08

[52] U.S. Cl. ..... 192/48.92; 192/56 C; 192/81 C; 192/150

[58] Field of Search ..... 192/56 C, 48.4, 48.92, 192/12 BA, 17 D, 75, 81 C, 30 W, 150

[56] References Cited

U.S. PATENT DOCUMENTS

| | | | |
|---|---|---|---|
| 1,629,420 | 5/1927 | Starkey | 192/56 C X |
| 2,510,667 | 6/1950 | Starkey | 192/81 C |
| 2,533,973 | 12/1950 | Starkey | 192/56 C X |
| 2,595,454 | 5/1952 | Greenlee | 192/56 C X |
| 2,751,773 | 6/1956 | Woodson | 192/12 BA |
| 2,885,042 | 5/1959 | Frechette | 192/17 D X |
| 3,618,730 | 11/1971 | Mould | 192/56 C |
| 4,243,129 | 1/1981 | Schopes | 192/56 C |
| 4,328,871 | 5/1982 | Gluskin | 192/56 C X |
| 4,437,552 | 3/1984 | Toyama | 192/12 BA X |
| 4,499,980 | 2/1985 | Kaminski et al. | 192/48.92 X |

*Primary Examiner*—Rodney H. Bonck
*Attorney, Agent, or Firm*—Willian Brinks Olds Hofer Gilson & Lione

[57] ABSTRACT

An adjustable torque limiting assembly includes a first wrap spring mechanism which provides a readily adjustable torque transmission limit and a second coaxially disposed wrap spring mechanism which provides a mechanical signal that the torque limit has been reached. This signal may be utilized to terminate an energy supply to a prime mover associated with the torque limiting assembly. The first wrap spring mechanism generally includes a wrap spring in which the spring moment and thus the slip or overrunning torque threshold may be readily adjusted. The second wrap spring assembly likewise includes a wrap spring which is activated only subsequent to slip of the first wrap spring and enlarges to engage a concentrically disposed control sleeve. The control sleeve then rotates and activates an associated shut-off mechanism. Drive from the first wrap spring assembly to an output shaft is through an overrunning clutch assembly which allows energy in the wrap springs to dissipate and the springs to wind down and return to their start positions when power to the torque limiting assembly is removed.

40 Claims, 3 Drawing Sheets

ADJUSTABLE TORQUE LIMITING ASSEMBLY

Matter enclosed in heavy brackets [ ] appears in the original patent but forms no part of this reissue specification; matter printed in italics indicates the additions made by reissue.

This application is a continuation of application Ser. No. 568,773, filed Jan. 6, 1984, now abandoned.

BACKGROUND OF THE INVENTION

The instant invention relates generally to adjustable torque limiting assemblies and more specifically to adjustable torque transmitting assemblies which are capable of providing an indication or signal that the preselected torque threshold has been reached.

Mechanical assemblies designed to determine torque throughput and utilize such determination to limit such torque by slip or by terminating the flow of energy to an associated prime mover are common power train components. Such assemblies, for example, are an integral portion of power tools which are utilized to tighten fasteners, secure threaded components and generally tighten coupling mechanisms to a desirable level of torque. For purposes of illustration, a specific example is known as a nut runner; a device having an electric or, more typically pneumatic motor which drives a through gear reduction device to tighten threaded fasteners such as bolts, nuts and the like. In such applications, it is desirable to quickly, repeatedly and accurately tighten the fastener such that the associated components are secured together with a necessary, predetermined force. Numerous approaches have been taken, particularly with pneumatic motors to achieve this goal, motor back pressure sensors, stall torque controllers and strain gauges coupled to associated electronics and controls, to name but three. Mechanical devices such as back pressure sensors typically suffer from an inability to be readily adjusted whereas such electronic devices may be delicate and complex.

A second drawback of all systems wherein operation of the prime mover continues until the sensed torque achieves a predetermined threshold at which time energy flow to the prime mover is terminated, is that in such devices, almost without exception, the drive components such as the motor and gear train are directly coupled to the driven fastener. In this situation, in spite of the fact that the monitoring device has sensed attainment of the torque limit and terminated energy flow to the motor, the momentum of the drive train will be transmitted to the fastener, generally over-torquing it. Initially, it would seem that this difficulty could be corrected to simply lowering the required torque threshold by an amount commensurate with the momentum energy. However, the rate at which the motor decelerates as it approaches the torque limit due to the hardness or softness of the joint will effect the momentum energy applied to the fastener and render such a simple compensation scheme generally ineffective.

It thus becomes apparent that an improved torque limiting assembly will both permit ready adjustment of the torque transmission limit as well as providing a means whereby all or a major portion of the drive train energy can be prevented from reaching the driven device. The following is a description of such an adjustable torque limiting assembly.

SUMMARY OF THE INVENTION

An adjustable torque limiter assembly according to the instant invention includes a first wrap spring mechanism which provides a readily adjustable torque transmission limit and a second coaxially disposed wrap spring mechanism which provides a mechanical signal that the torque threshold has been reached. The first wrap spring assembly includes an input shaft which drives a hub in which a spring retaining sleeve is secured. The end of the sleeve opposite the hub drives one end of the first wrap spring, the other end of which is adjustably secured to the hub. The first wrap spring is disposed upon a sleeve which is turn supported by an overrunning clutch assembly. The overrunning clutch assembly unidirectionally drives the output shaft. Mounted in this fashion, the moment of the first wrap spring can be adjusted over a range of from zero up to a maximum which is a function of several variables, most significantly the radial interference between the wrap spring (in a relaxed state) and the sleeve upon which it is disposed. The first wrap spring assembly operates substantially conventionally. Power supplied to the input shaft is transferred to the end of the wrap spring opposite the input hub and tends to unwind it. Until the torque transmitted through the first wrap spring assembly exceeds the moment of the wrap spring, no slippage occurs and power is transmitted directly through it, to the overrunning clutch assembly and to an output shaft. When it exceeds it, the wrap spring slips and no power is transmitted therethrough.

The second wrap spring assembly includes a wrap spring wound in a sense opposite to that of the first wrap spring and disposed partially on the exterior surface of the spring retainer of the first wrap spring and partially upon a hub secured to the output shaft. A control sleeve is positioned concentrically about the second wrap spring and includes a mechanism such as a cooperating ramp and control rod which, through axial translation, indicates rotation thereof. When the adjustable limit of the first wrap spring assembly has been reached and a disparity of rotational speeds thus exists between the spring retaining sleeve and the output hub, the two components about which the second wrap spring is disposed, its diameter enlarges and engages the control sleeve, thereby rotating it and actuating an associated shutoff mechanism. At the completion of an operating cycle, the overrunning clutch assembly disposed within the first wrap spring assembly permits energy dissipation of the wrap springs through rotation of various associated components and return of the springs to their initial states.

It is therefore an object of the instant invention to provide an adjustable torque limiting assembly wherein the torque transmission threshold is readily adjustable.

It is a further object of the instant invention to provide an adjustable torque limiting assembly which provides a signal or indication that the torque limit has been reached.

It is a further object of the instant invention to provide an adjustable torque limiting assembly which is compact, rugged and easy to manufacture.

It is a further object of the instant invention to provide an adjustable torque limiter wherein reset of the wrap springs is provides by an overrunning clutch assembly.

Further objects and advantages of the instant invention will become apparent by reference to the following description of the preferred embodiment and attached drawings.

DESCRIPTION OF THE PREFERRED EMBODIMENTS

Figure 1:
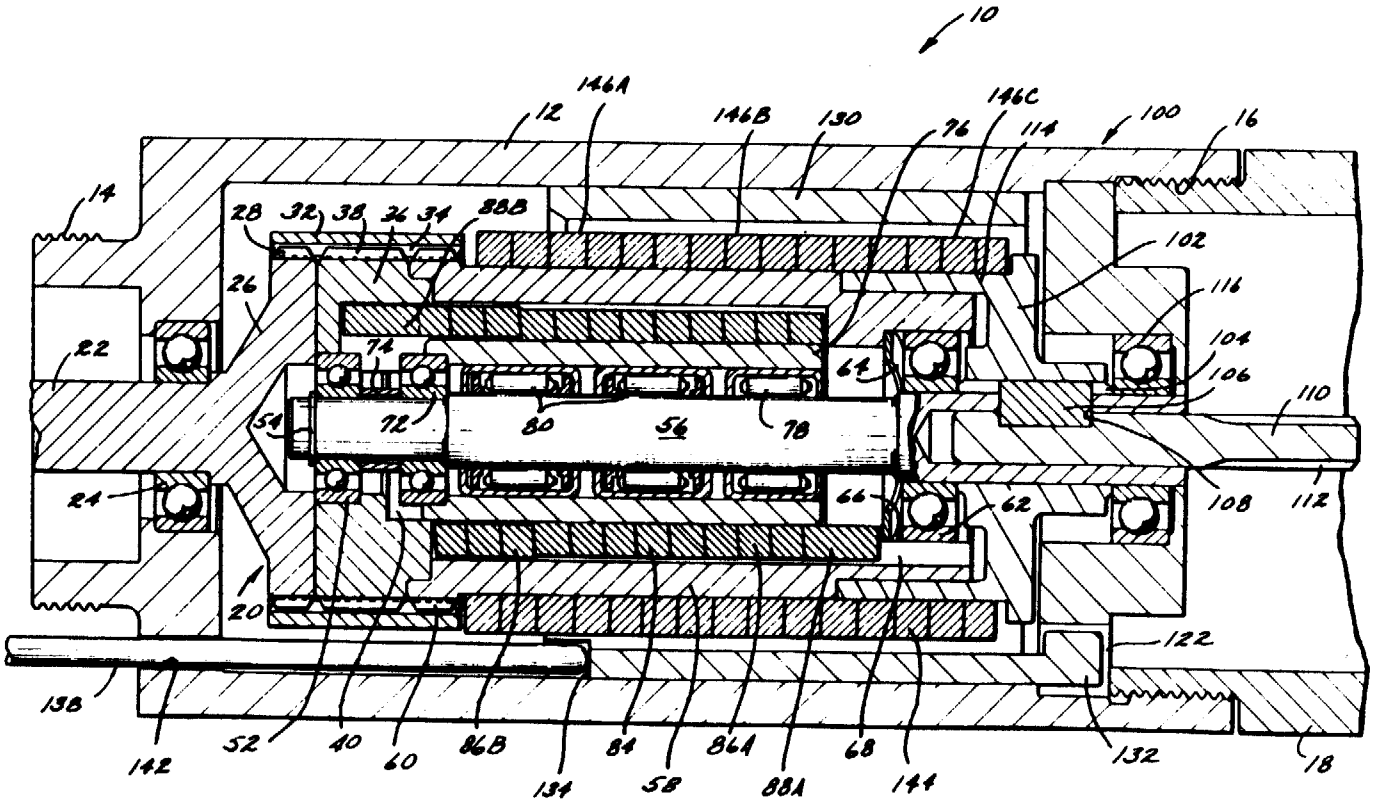
FIG. 1 is a full, sectional view of an adjustable torque limiting assembly according to the instant invention.
Figure 2A:
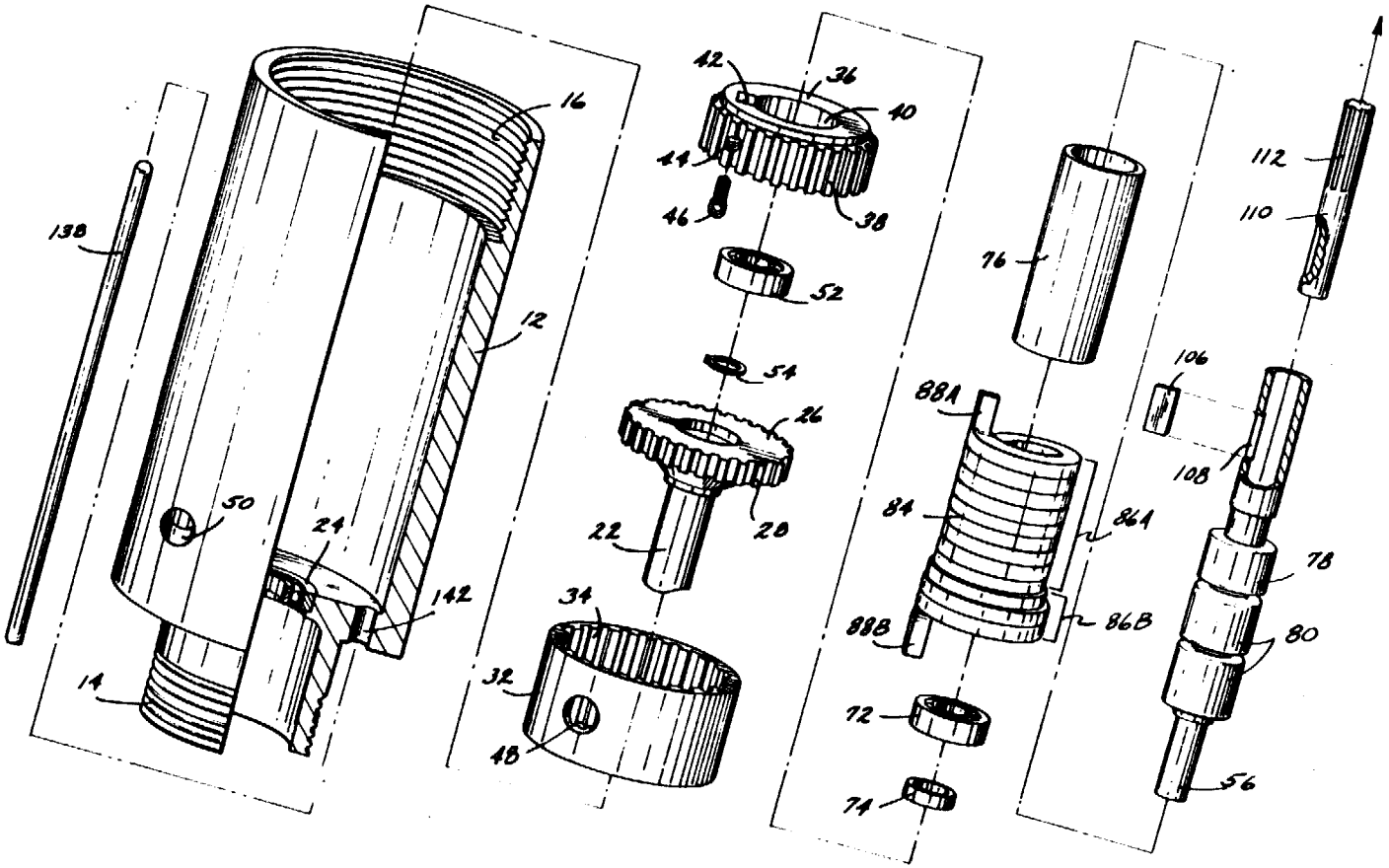
FIGS. 2A is an exploded, perspective view of a portion of the elements of an adjustable torque limiting assembly to the instant invention.
Figure 2B:
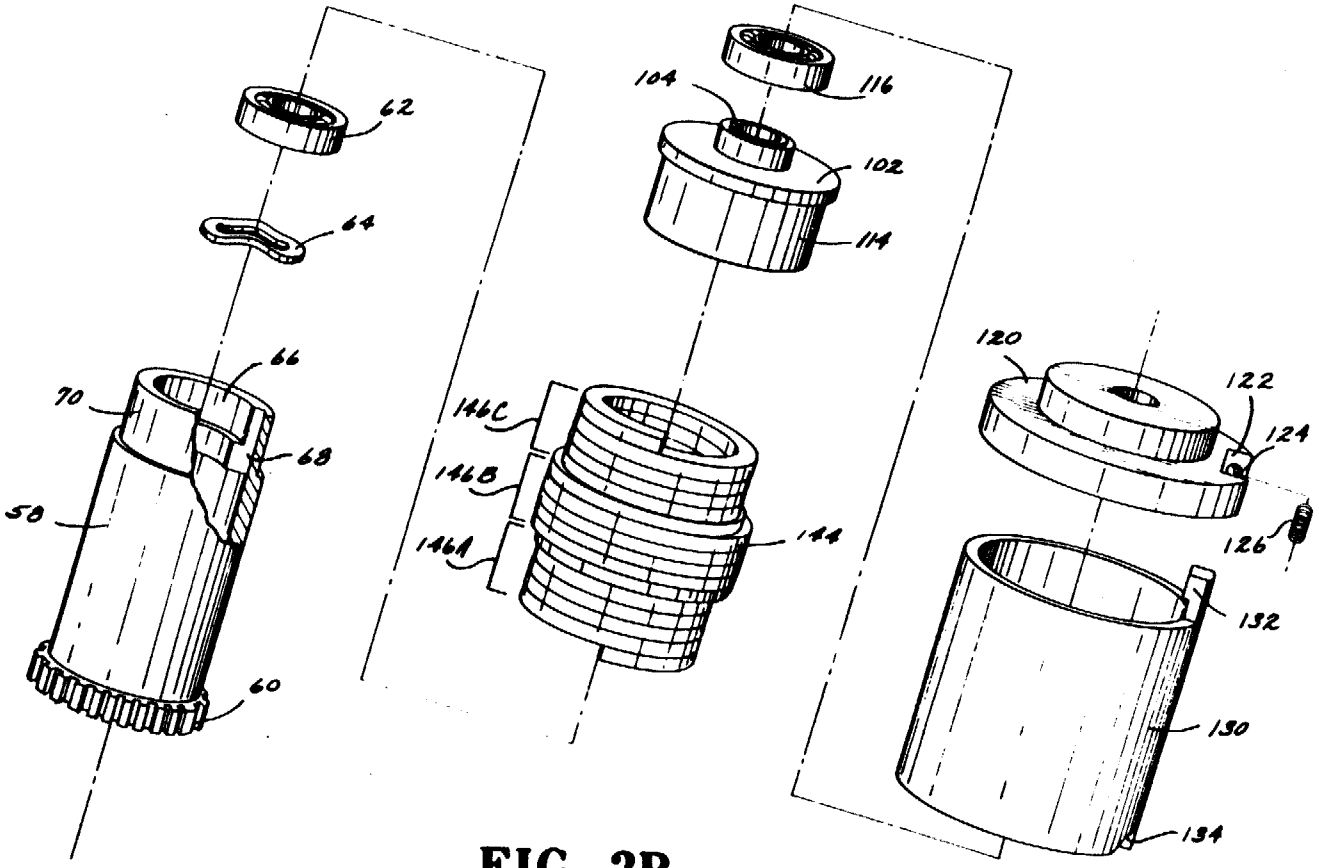
FIG. 2B is an exploded, perspective view of the remaining elements of an adjustable torque limiting assembly according to the instant invention.

Referring now to FIGS. 1, 2A and 2B, an adjustable torque limiting assembly according to the instant invention is illustrated and generally designated by the reference numeral 10. The assembly 10 includes and is generally contained within an elongate cylindrical housing 12. The housing 12 includes a threaded, reduced diameter portion 14 which may be engaged within complementary threads in the housing of a prime mover (not illustrated) such as an electric or pneumatic motor. On the end of the housing 12, opposite the reduced diameter portion 14, is an internally threaded region 16 which receives a complementarily threaded housing 18 which may be associated with a final drive device (not illustrated).

A first wrap spring assembly 20 generally includes an input shaft 22 which is supported by an anti-friction bearing such as a ball bearing assembly 24 and which preferably includes an integrally formed input hub 26 having splines 28 disposed about its periphery. Concentrically disposed about and receiving the splines 28 of the input hub 26 and extending generally axially away from the input shaft 22 is a coupling annulus 32 having complementary splines 34 disposed on its inner surface. Also received and retained within the coupling annulus 32 is a spring receiving adjustment hub 36 having complementary splines 38 which engage the splines 34 within the coupling annulus 32. The adjustment hub 36 defines a centrally disposed through opening 40 and an axially oriented spring receiving channel 42 extending outwardly from the opening 40. A tangentially disposed threaded passageway 44 aligns generally with the spring receiving channel 42 and receives a complementarily threaded adjustment screw 46. Access to the threaded adjustment screw 46 is achieved through an aperture 48 in the coupling annulus 32. It should be understood that since the splines 34 and 38 inhibit relative rotation between the coupling annulus 32 and the adjustment hub 36, the passageway 44 and the adjustment screw 46 must be aligned with the aperture 48 during assembly of these element in order that access to the adjustment screw 46 can be achieved. A suitably sized and positioned access port 50 formed in the housing 12 facilitates access to the adjustment screw 46 when the coupling annulus 32 is appropriately rotated and the aperture 48 is aligned with the access port 50. The access port 50 may be closed or sealed with a sliding gate or plug (both not illustrated) in order to, first of all, prevent foreign matter from entering the housing 12 and, second of all, control access to the adjustment screw 46. Ready or limited access to the adjustment screw 46 may be elected by the selection of a closure which may be removed by a common tool such as a screwdriver or may only be removed by a specially coded or unique tool, thereby lessening the likelihood of unauthorized adjustment. An anti-friction bearing such as a ball bearing assembly 52 rotatably supports the adjustment hub 36. A spring retainer 54 maintains the position of the ball bearing assembly 53 on an axially extending output shaft 56. Lastly, a cylindrical spring retaining sleeve 58 having splines 60 disposed at one end which are engaged by the splines 34 of the coupling annulus 32 extends generally concentrically about the output shaft 56 in a direction away from the input shaft 22 and is supported at its other end by an anti-friction bearing such as the ball bearing assembly 62. The roller bearing assembly 62 and a wave washer 64 are both received within a complementarily sized enlarged diameter region 66 of the cylindrical spring retaining sleeve 58. Extending axially along the inside of the spring retaining sleeve 58, generally adjacent the region 66, is a spring retaining channel 68. The spring retaining sleeve 58 also includes a reduced diameter region 70 which is received within other elements of the assembly 10. Another anti-friction bearing such as a ball bearing assembly 72 is disposed about the output shaft 56 and spaced from the ball bearing assembly 52 by an annular spacer 74 disposed about the output shaft 56. The ball bearing assembly 72 radially centers and supports an axially extending cylindrical clutch sleeve 76. The clutch sleeve 76 is disposed concentrically about the output shaft 56 and supported at its opposite end by an anti-friction bearing such as a roller bearing assembly 78. Disposed between the ball bearing assembly 72 and the roller bearing assembly 78 and positioned concentrically about the output shaft 56 and within the clutch sleeve 76 are a pair of overrunning clutch assemblies 80. The clutch assemblies 80 are conventional and rotationally couple the clutch sleeve 76 to the output shaft 56 upon relative rotation in one direction and free wheel or uncouple these components upon rotation in the opposite direction. Finally, the first wrap spring assembly 20 includes a first wrap spring 84 positioned generally concentrically about the clutch sleeve 76. The wrap spring 84 consists of a plurality of turns, a larger portion of turns 86A consisting of approximately 8 to 10 turns having an inside diameter which creates an interference fit about the clutch sleeve 76 and a smaller portion of turns 86B consisting of a smaller number of turns having an inside diameter equal to or somewhat greater than the outside diameter of the clutch sleeve 76. The spacing between the smaller portion of turns 86B and the clutch sleeve 76 in FIG. 1 is somewhat exaggerated for purposes of illustration and the wrap spring 84 is illustrated in FIG. 2A in its relaxed state. At both ends of the wrap spring 84, the spring 84 is formed into an axially extending tang. A first tang 88A is received in the axially extending spring receiving channel 68 formed in the spring retaining sleeve 58 and a second tang 88B is received within the spring receiving channel 42 if the adjustment hub 36.

A second wrap spring assembly 100 generally includes an output hub 102 which is concentrically disposed about the output shaft 56. The output hub 102 includes a keyway 104 which receives a key 106. The key 106 extends through a complementary sized radially oriented slot 108 in the sidewall of the output shaft 56 and into a stub shaft 110 thereby securing these three elements together. The stub shaft 110 may include splines or gear teeth 112 which mate with power receiving components disposed within the housing 18. The hub 102 also includes a cylindrical spring receiving surface 14 having a diameter equal to the outside diameter of the spring retaining sleeve 58. In a region directly adjacent the output hub 102, the output shaft 56 is rotatably supported by an anti-friction bearing such as a ball bearing assembly 116. The ball bearing assembly 116 is in turn fixedly and concentrically supported within the housing 12 within a stepped circular spacer 120. The circular spacer 120 includes a notch or through channel 122 extending radially inwardly from its periphery. Tangentially disposed in one of the sidewalls of the channel 122 is a blind opening 124 which receives a compression spring 126. A cylindrical control sleeve 130 is disposed concentrically within the housing 12 and generally adjacent the inner wall thereof. The control sleeve 130 includes a longitudinally oriented tab 132 which extends into the channel 122 of the circular spacer 120 and which engages the end of the compression spring 126 extending from the blind opening 124. At the opposite end of the cylindrical control sleeve 130 is an inclined surface or ramp 134 which extends through a small circumferential angle, typically less than about 10° and obliquely interconnects a first surface and a second, axially distinct surface. Abutting the ramp 134 and translated axially due to rotation of the ramp 134 and the cylindrical control sleeve 130 is an axially extending control rod 138. The control rod 138 is received within the extends axially through a suitably disposed aperture 142 formed in the housing 12. The control rod 138 may be connected to any suitable mechanical, electrical or pneumatic control. The control will be actuated when the adjustable torque limiting assembly 10 has reached the predetermined torque transmission level. Finally, the second wrap spring assembly 100 includes a second wrap spring 144. The second wrap spring 144 includes first and third end portions of turns 146A and 146C, respectively, which each occupy approximately one-third of the axial length and, in their relaxed state, have an inside diameter smaller than the outside diameter of the spring retaining sleeve 58 and the surface 114 on the output hub 102. The second wrap spring 114 also includes a second middle portion of turns 146B which occupies the remaining one-third of its axial length and, in its relaxed state, has an inside diameter equal to or slightly less than one outside diameter of the spring retaining sleeve 58. The second wrap spring is illustrated in FIG. 2B in its relaxed state.

With reference now to all of the drawing figures and particularly FIG. 1, the operation of the adjustable torque limiting assembly 10 will now be described. Unless otherwise noted, the following description relates to an assembly 10 wherein drive to the input shaft 22 is in a clockwise direction when viewing the assembly 10 from the input shaft 22 end, that is, from the left end as illustrated in FIG. 1.

As those familiar with the operation of wrap spring clutches will readily appreciate, the maximum torque transmitted by a wrap spring to a driven hub it is disposed about when the torque is applied to the spring in such a direction as to unwind or disengage the spring from the hub is a function of, among other variables, the moment in the spring and the number of turns engaging the hub. The moment in a wrap spring is the result of an initial interference between the spring and the hub and is normally a finite value dependent primarily upon the radial interference between the at-rest inner diameter of the spring and the outside diameter of the hub, the geometry of the spring and the properties of the spring material.

Turning again to the adjustable wrap spring assembly 10 and specifically the first wrap spring assembly 20, it should be noted that the first wrap spring 84 is of left hand sense when the input shaft 22 rotates clockwise as state above. The first wrap spring 84 includes approximately nine turns of rectangular wire constituting the larger portion of turns 86A having a preselected inside diameter sized to provide specific radial interference with the clutch sleeve 76. Commensurate with such interference, a preselected moment as induced in the first wrap spring 84. The first wrap spring 84 also includes a smaller portion of turns 86B adjacent the adjustment hub 36 which, as noted previously, initially has an inside diameter equal to or slightly larger than the sleeve 76 and thus do not interfere with the sleeve 76 and furthermore initially have no moment induced therein. The end of the first wrap spring 84 adjacent the smaller portion of turns 86B is adjustably received within the adjustment hub 36. The opposite end of the wrap spring 84, specifically the tank 88A, is received within the spring receiving slot 68 of the spring retaining sleeve 58. It should thus be appreciated that this assembly effectively permits adjustment of the preload moment on the first wrap spring 84 by virtue of repositioning the tang 88B by movement of the threaded adjustment screw 46. It can be appreciated that proper sizing of the spring receiving channel 42 and appropriate selection of the torsional spring rate of the turns of the smaller portion of turns 86B of the first wrap spring 84 will permit adjustment of the tang 88B of the first wrap spring 84 through an angle large enough to induce a moment in the turns of the smaller portion 86B equal to or slightly greater than the moment induced in the turns of the larger portion 86A by virtue of their interference with the sleeve 76. This condition represents a practical preload limit since if this were the case, the turns of the larger portion of turns 86A would lift off the sleeve 76 and no torque could be transmitted to the sleeve 76 by the first wrap spring 84. Thus it will be appreciated that the moment induced by the turns of the larger portion 86A of the first wrap spring 84 by virtue of their interference with the sleeve 76 remains a fixed magnitude. The reaction to the moment will be shared by varying degrees by the sleeve 76 and the moment adjusted into the turns of the smaller portion 86B by the adjustment screw 46. Thus, that portion of the moment borne by the sleeve 76 varying from all to nothing depending upon the adjustment, becomes the moment in the turns of the smaller portion 86A and thus determines the slip point of the first wrap spring 84.

The power flow path through the first wrap spring assembly 20 is generally from the input shaft 22 and input hub 26 through the coupling annulus 32 and to the spring retaining sleeve 58, the tang 88A of the first wrap spring 84, to the sleeve 76, through the overrunning clutches 80 which transmit rotational energy to the output shaft 56 when their outer housings are driven in a clockwise direction but freewheel on the output shaft 56 when they are similarly driven in a counterclockwise direction and through the output shaft 56. It will thus be readily understood that depending upon the setting of the adjustment screw 46 and thus the moment in the turns of the larger portion 86A of the first wrap spring 84, torque through the first wrap spring assembly 20 will be transmitted up to the limit determined by the preselected moment.

When the first wrap spring assembly 20 has reached and exceeded its torque limit, slipping and a rotational speed disparity between the input and output members, i.e., the input shaft 22 and the output shaft 56, are the prime manifestations of such torque limit attainment. It is, however, highly desirable to provide a mechanical or mechanically driven indication that such torque limit has been achieved. This is desirable since rapid shut down of power sources obviates the necessity for the torque transmitting elements of the assembly 10 to be designed for extended or continuous overrunning duty. The second wrap spring assembly 100 provides a mechanical indication that the torque limit condition of the first wrap spring assembly 20 has been achieved. This indication may be utilized by a variety of means to mechanically terminate an air supply to a pneumatic motor, mechanically trip and electric switch which removes power to a motor or actuate any associated controlling equipment as can be readily understood. The second wrap spring 144 is of right hand sense. The first and second portions of turns 146A and 146B, respectively, of the second wrap spring 144 engage the outside surface of the spring retaining sleeve 58 whereas the third portion of turns 146C on the right end engages the surface 114 of the output hub 102. The first and third portions of turns 146A and 146C are approximately equal in diameter and interfere with the surfaces upon which they rest to induce a predictable fixed moment in the second wrap spring 144. The middle or second portion of turns 146B is sized slightly smaller than the adjacent contacted surface of the spring retaining sleeve 58. When the first wrap spring assembly 20 is in its overrunning condition, a difference in the speeds of rotation of the spring retaining sleeve 58 and output hub 102 will exist causing the middle or second portion of turns 146B to lift off the outer surface of the spring retaining sleeve 58. Lift off occurs when the torque exceeds the small moment due to the minimal initial interference of the middle or second portion of turns 146B with the sleeve 58. As torque continues to increase, the second or middle portion of turns 146B will continue to expand in a predictable manner related linearly to the torque. At a predictable value of torque, the second or middle portion of turns 146B of the spring 144 will expand and engage the inside surface of the cylindrical control sleeve 130. The cylindrical control sleeve 130 is loosely disposed within the housing 12 and frictional engagement will rotate the control sleeve 130, compress the spring 126 and move the control rod 138 along the ramp 134. This activity will axially translate the control rod 138 and provide an indication that the torque limit of the assembly 10 has been reached. It should, of course, be understood that various sensing and indicating means may be utilized to detect rotation of the cylindrical control sleeve 130 and that the ramp 134 and associated control rod 138 are but one means.

From the foregoing description, it should be apparent that the actuation point of the control sleeve 130 and thus the limit torque of the two clutch assemblies 20 and 100 acting together is additive. The maximum torque transmitted to the output shaft 56 by the second wrap spring assembly 100 is equal to the torque required to engage the middle portion of turns 146B with the cylindrical control sleeve 130.

When the foregoing activity has occurred and power to the adjustable torque limiting assembly 10 through the input shaft 22 has been terminated, the assembly 10 must be reset. In order to reset, the output hub 102 must advance clockwise relative to the spring retaining sleeve 58 in order to wind down the middle portion of turns 146B of the second wrap spring 144 and allow the spring 126 to rotate the control sleeve 130 to its initial or start position. When load or input torque is removed, the torque stored in the spring 144 can either advance the output hub 102 or backdrive the cylindrical spring retaining sleeve 58 and the associated input components. In order to do this, the torque in the second wrap spring 144 would have to be capable of slipping the first wrap spring assembly 20. The inclusion of the overrunning clutches 80, however, enables the output hub 102 to advance clockwise relative to the other components.

Several features, advantages and additional observations of the adjustable torque limiting assembly 10 should be made. First of all, the precise size or scale and thus torque carrying capability of the assembly 10 is broad. Therefore, although the foregoing description may suggest utilization of assembly 10 with power tools, it should be understood and appreciated that the general design and construction disclosed herein may be scaled downwardly to accommodate and transmit torques in the range of a few inch-ounces or scaled upwardly to accommodate and transmit many foot-pounds of torque.

When the assembly 10, having springs 84 and 144 and clutches 80 as described, is driven in reverse, that is, in a direction counterclockwise as viewed from the input shaft 22 end the second wrap spring assembly 100 locks up since the drive tends to tighten the second wrap spring 144. Therefore, the first wrap spring assembly 20 is completely bypassed and full input torque and power is transferred through the assembly 10 to the output shaft 56 and stub shaft 110 in reverse.

It should also be appreciated that the first and second wrap spring assemblies 20 and 100, respectively, may be disposed and may operate independently as individual elements in a power transmission system. Operation of the second wrap spring assembly 100 has been described above and corresponding operation will occur when the assembly 100 is utilized as a separate entity.

The operation of the first wrap spring assembly 20 as a separate entity is the same as that described above. However, since the second wrap spring assembly 100 locks up in the reverse direction (counter-clockwise and with the stated spring senses), effectively bypassing the first spring asembly 20, the latter's operation in reverse as a separate entity is significantly different than that described above. Thus, operation of the first wrap spring assembly 20 having a spring 84 and clutches 80 as described above in a reverse direction, i.e., counterclockwise when viewed from the input shaft 22 end and independent of the second wrap spring assembly 100, will now be described. When so rotating, input torque will tend to wrap the first wrap spring 84 more tightly. Rotating in this direction, force will be applied to the tang 88A of the first wrap spring 84 by the opposite edge of the spring receiving slot 68 in the sleeve 58. If the slot 68 were radially enlarged, no force could be transferred to the tang 88A received therein but would instead be transferred to and through the tang 88B received within the adjustment hub 36. In this case, the force applied to the tang 88B and thus the spring 84 would be in the same direction as the adjusted torque. Any torque applied to the turns of the smaller portion 86B which is greater than the adjusted torque will further deflect the turns beyond the deflection due to adjustment. Continued counterclockwise deflection of the tang 88B will cause separation from the slot 68 and sleeve 58, thereby removing all moment or preload from the larger portion of turns 86A. With this preload removed, the slip threshold torque of the first wrap spring assembly 20 will become equal to the torque induced by interference. The inner wrap spring assembly 20 therefore is adjustable in one direction but provides a constant overrunning or slip torque value in the opposite direction. This holds true for all values of adjustment except zero in which case the overrunning torque is zero in both directions.

It should also be noted that the splined coupling annulus 32 provides a significant manufacturing benefit. Typical manufacturing tolerances in the size as well as the finishes of components in the areas relating to the first wrap spring 84 will cause variation in the initial moment induced by interference between the first wrap spring 84 and the cylindrical sleeve 76. Given the nature of the splined couplings associated with the annular coupling 32, this initial moment can always be designed to equal or exceed the target clutch torque. Any variation above this target torque can be permanently adjusted out during the assembly process by inducing the difference as a small preload in smaller portion of turns 86B of the first wrap spring 84 when the tang 88B is initially engaged in the adjustment hub 36 and maintaining such preload by the angular positioning and engagement of the splines 60 with the splines 34 of the coupling annulus 32 as the sleeve 58 is engaged therewith.

Finally, it should be understood that if the adjustable torque limiting assembly 10 is to be utilized in an application where the input shaft 22 rotates in a counterclockwise direction as viewed from the input end of the housing 12, the sense of the first wrap spring 84 should be right hand, the overrunning clutches 80 should lock, i.e., transfer torque, when their outer housings are driven in a counterclockwise direction relative to the output shaft 56 and overrun when driven in the opposite direction and the second wrap spring 144 should be of left hand sense then, the foregoing discussion of operation of the assembly 10 in the reverse direction will apply when the input shaft 22 is rotated clockwise.

The foregoing disclosure is the best mode devised by the inventor for practicing this invention. It is apparent, however, that apparatus incorporating modifications and variations will be obvious to one skilled in the art of adjustable torque limiting devices. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. An adjustable torque limiting assembly comprising, in combination, a first wrap spring having a pair of ends, an input member having means for receiving said pair of ends of said wrap spring, means associated with said input member for adjusting the [relative] angular position of one of said pair of ends relative to the other of said pair of ends, an output member disposed within said first wrap spring, said output member having a cylindrical portion engaged by at least *a* portion of said first wrap spring, a second wrap spring disposed about portions of said input member and said output member and a member having a cylindrical opening disposed about said second wrap spring.

2. The torque limiting assembly of claim 1 wherein said first wrap spring, in a relaxed state, includes a first plurality of turns having an insided diameter smaller than the outside diameter of said cylindrical portion of said output member.

3. The torque limiting assembly of claim 1 wherein said pair of ends of said first wrap spring define generally axially extending tangs.

4. The torque limiting assembly of claim 1 further including an output shaft and an overrunning clutch operably disposed between said output member and said output shaft.

5. The torque limiting assembly of claim 1 wherein said input member includes an input shaft, a cylindrical sleeve for receiving said first wrap spring and means for selectively angularly coupling said input shaft to said sleeve.

6. The torque limiting assembly of claim 5 wherein said coupling means, said input shaft and said cylindrical sleeve includes splines, said splines of said coupling means being complementary to said splines on said input shaft and said cylindrical sleeve.

7. The torque limiting assembly of claim 1 further including an output shaft, an overrunning clutch operation disposed between said output shaft and said output member, and a cylindrical member concentrically disposed about said second wrap spring and rotatable between a first position and a second position.

8. The torque limiting assembly of claim 7 further including means associated with said cylindrical member and movable between a first axial position corresponding to said first position of said cylindrical memberand a second axial position corresponding to said second position of said cylindrical member.

9. The torque limiting assembly of claim 7 wherein said first wrap spring is of left hand sense and said second wrap spring is of right hand sense.

10. The torque limiting assembly of claim 1 wherein said means associated with said input member includes a threaded adjustment mechanism generally tangentially [aligned with said one of said pair of ends of said] *oriented with respect to the axis of said first* wrap spring.

11. An assembly for limiting torque transmission comprising, in combination, a first wrap spring having a pair of ends, *an* input member having means for receiving said pair of ends of said first wrap spring, means associated with one of said pair of ends of said first wrap spring for adjusting the [relative]angular position of said one of said pair of ends relative to the other of said pair of ends, an inner sleeve disposed within said first wrap spring, an output member, an overrunning clutch [operable] *operably* disposed between said sleeve and said output member, a second wrap spring disposed to engage [portionsof] *portions of* said input member and said output member, and an outer sleeve disposed about said second wrap spring.

12. The torque limiting assembly of claim 11 wherein said first wrap spring, in a relaxed state, includes a first plurality of turns having an inside diameter smaller than the outside diameter of said inner sleeve.

13. The torque limiting assembly of claim 12 wherein said first wrap spring and said second wrap spring are of opposite sense.

14. The torque limiting assembly of claim 11 wherein said first wrap spring assembly, in a relaxed state, includes a second plurality of turns having an inside diameter at least as large as the outside diameter of said inner sleeve.

15. The torque limiting assembly of claim 14 wherein said ends of said first wrap spring are a pair of tangs extending axially from said turns.

16. The torque limiting assembly of claim 11 wherein said input member and said output member both include cylindrical surfaces having equal outside diameters.

17. The torque limiting assembly of claim 16 wherein said second wrap spring, in a relaxed state, includes two end adjacent regions having a first inside diameter and a third, intermediate region having a second, larger inside diameter and said larger inside diameter is less than said outside diameter of said cylindrical surface of said input member.

18. The torque limiting assembly of claim 11 wherein said second wrap spring, in a relaxed state, includes two end adjacent regions having a first inside diameter and a third, intermediate region having a second, larger inside diameter.

19. The torque limiting assembly of claim 11 further including means for biasing said outer sleeve toward one of two rotational position.

20. An assembly for limiting torque throughput comprising, in combination, a first wrap spring having a pair of ends, an input member having a pair of means for receiving a respective one of said pair of ends of said first wrap spring, means associated with one of said pair of ends of said first wrap spring for adjusting the [relative] angular position of said one of said pair of ends relative to the other of said pair of ends, a cylindrical sleeve disposed within said first wrap spring, an output member, an overrunning clutch assembly operably disposed between said cylindrical sleeve and said output member, a second wrap spring disposed to engage portions of said input member and said output member, and a sensing element concentrically disposed about said second wrap spring and rotatable between a first position and a second position.

*21. An adjustable torque limiting assembly comprising, in combination, a first wrap spring having a pair of ends, an input member having means for engaging said pair of ends of said wrap spring, means associated with said input member for adjusting the angular position of one of said pair of ends relative to the other of said pair of ends, an output member disposed within the first wrap spring, said output member having a cylindrical portion engaged by at least a portion of said first wrap spring, a second wrap spring disposed about portions of said input member and said output member and a member having a cylindrical opening disposed about said second wrap spring.*

*22. The torque limiting assembly of claim 21 wherein said first wrap spring, in a relaxed state, includes a first plurality of turns having an inside diameter smaller than the outside diameter of said cylindrical portion of said output member.*

*23. The torque limiting assembly of claim 21 further including an output shaft and an overrunning clutch operably disposed between said output member and said output shaft.*

*24. The torque limiting assembly of claim 21 wherein said input member includes an input shaft, a cylindrical sleeve for receiving said first wrap spring and means for selectively angularly coupling said input shaft to said sleeve.*

*25. The torque limiting assembly of claim 24 wherein said coupling means, said input shaft and said cylindrical sleeve include splines, said splines of said coupling means being complementary to said splines on said input shaft and said cylindrical sleeve.*

*26. The torque limiting assembly of claim 21 further including an output shaft, an overrunning clutch operably disposed between said output shaft and said output member, and a cylindrical member concentrically disposed about said second wrap spring and rotatable between a first position and a second position.*

*27. The torque limiting assembly of claim 26 further including means associated with said cylindrical member and movable between a first axial position corresponding to said first position of said cylindrical member and a second axial position corresponding to said second position of said cylindrical member.*

*28. The torque limiting assembly of claim 26 wherein said first wrap spring is of left hand sense and said second wrap spring is of right hand sense.*

*29. The torque limiting assembly of claim 21 wherein said means associated with said input member includes a threaded adjustment mechanism generally tangentially oriented with respect to the axis of said first wrap spring.*

*30. The torque limiting assembly of claim 21 wherein said input member includes an elongate cylindrical sleeve and said means for engaging said pair of ends includes a splined collar.*

*31. An assembly for limiting torque transmission comprising, in combination, a first wrap spring having a pair of ends, an input member having means for engaging said pair of ends of said first wrap spring, means associated with one of said pair of ends of said first wrap spring for adjusting the angular position of said one of said pair of ends relative to the other of said pair of ends, an inner sleeve disposed within said first wrap spring, an output member, an overrunning clutch operably disposed between said sleeve and said output member, a second wrap spring disposed to engage portions of said input member and said output member, and an outer sleeve disposed about said second wrap spring.*

*32. The torque limiting assembly of claim 31 wherein said first wrap spring, in a relaxed state, includes a first plurality of turns having an inside diameter smaller than that outside diameter of said inner sleeve.*

*33. The torque limiting assembly of claim 32 wherein said first wrap spring and said second wrap spring are of opposite sense.*

*34. The torque limiting assembly of claim 31 wherein said first wrap spring assembly, in a relaxed state, includes a second plurality of turns having an inside diameter at least as large as the outside diameter of said inner sleeve.*

*35. The torque limiting assembly of claim 31 wherein said input member and said output member both include cylindrical surfaces having equal outside diameters.*

*36. The torque limiting assembly of claim 35 wherein said second wrap spring, in a relaxed state, includes two end adjacent regions having a first inside diameter and a third, intermediate region having a second, larger inside diameter and said larger inside diameter is less than said outside diameter of said cylindrical surface of said input member.*

*37. The torque limiting assembly of claim 31 wherein said second wrap spring, in a relaxed state, includes two end adjacent regions having a first inside diameter and a third, intermediate region having a second, larger inside diameter.*

*38. The torque limiting assembly of claim 31 further including means for biasing said outer sleeve toward one of two rotational positions.*

*39. The torque limiting assembly of claim 31 wherein said input member includes an elongate cylindrical sleeve*

*and said means for engaging said pair of ends includes a splined collar.*

*40. An assembly for limiting torque throughput comprising, in combination, a first wrap spring having a pair of ends, an input member having a pair of means for engaging a respective one of said pair of ends of said first wrap spring, means associated with one of said pair of ends of said first wrap spring for adjusting the angular position of said one of said pair of ends relative to the other of said pair of ends, a cylindrical sleeve disposed within said first wrap spring, an output member, an overrunning clutch assembly operably disposed between said cylindrical sleeve and said output member, a second wrap spring disposed to engaged portions of said input member and said output member, and a sensing element concentrically disposed about said second wrap spring and rotatable between a first position and a second position.*

* * * * *

UNITED STATES PATENT AND TRADEMARK OFFICE

CERTIFICATE OF CORRECTION

PATENT NO. : Re. 33,514

DATED : January 8, 1991

INVENTOR(S) : Donald A. Ciolli

It is certified that error appears in the above-identified patent and that said Letters Patent is hereby corrected as shown below:

Column 10, line 24, "operation" should be --operable--.

Column 11, line 21, "position" should be --positions--.

Column 12, line 41, "that" should be --the--.

Signed and Sealed this

Twenty-first Day of April, 1992

*Attest:*

HARRY F. MANBECK, JR.

*Attesting Officer*

*Commissioner of Patents and Trademarks*